(12) United States Patent
Wood, Sr. et al.

(10) Patent No.: US 11,833,987 B2
(45) Date of Patent: Dec. 5, 2023

(54) SUPER CAPACITOR BASED POWER MODULE FOR LIFT GATE

(71) Applicant: Systematic Power Manufacturing, LLC, Knovxille, TN (US)

(72) Inventors: Robert J. Wood, Sr., Oneonta, NY (US); Chad E. Hall, Oneonta, NY (US); Bryce Gregory, Oneonta, NY (US); Luke Yetto, Oneonta, NY (US); Daniel A. Patsos, Oneonta, NY (US); Joseph Agrelo, Oneonta, NY (US)

(73) Assignee: Systematic Power Manufacturing, LLC, Knoxville, TN (US)

( * ) Notice: Subject to any disclaimer, the term of this patent is extended or adjusted under 35 U.S.C. 154(b) by 0 days.

(21) Appl. No.: 17/721,269

(22) Filed: Apr. 14, 2022

(65) Prior Publication Data
US 2022/0396226 A1    Dec. 15, 2022

Related U.S. Application Data

(63) Continuation-in-part of application No. 17/690,784, filed on Mar. 9, 2022.
(Continued)

(51) Int. Cl.
*B60R 16/033* (2006.01)
*H02J 7/34* (2006.01)
(Continued)

(52) U.S. Cl.
CPC .......... *B60R 16/033* (2013.01); *B60P 1/4471* (2013.01); *H02J 7/14* (2013.01);
(Continued)

(58) Field of Classification Search
CPC ........ B60R 16/033; B60P 1/4471; H02J 7/14; H02J 7/342; H02J 7/345; H02J 2207/20; H02J 2310/46; Y02T 10/70
See application file for complete search history.

(56) References Cited

U.S. PATENT DOCUMENTS

| | | |
|---|---|---|
| 5,710,699 A | 1/1998 | King et al. |
| 6,476,586 B2 | 11/2002 | Yunosawa et al. |

(Continued)

OTHER PUBLICATIONS

Transmittal, International Search Report and Written Opinion dated Sep. 21, 2022 in related PCT/US22/33038; 18 pages.

*Primary Examiner* — Lincoln D Donovan
*Assistant Examiner* — Alex W Lam
(74) *Attorney, Agent, or Firm* — Peter L. Brewer; Thrive IP

(57) ABSTRACT

A hybrid power module is provided. The power module is associated with a truck having a lift gate. The power module includes a super capacitor comprising a bank of capacitors, with the super capacitor being in electrical communication with an alternator of the truck. The power module also includes a battery, a switch, a DC/DC boost converter, and electrical wiring. The electrical wiring connects the capacitor bank and first battery to the switch, and further connects the switch to a motor for the lift gate. The super capacitor and the first battery are positioned in parallel, with the super capacitor and the first battery residing proximate the lift gate. The super capacitor contains enough energy to power the electric motor for the lift gate through at least two operating cycles without the battery, protecting the lift gate if the battery goes weak.

28 Claims, 13 Drawing Sheets

Related U.S. Application Data

(60) Provisional application No. 63/279,525, filed on Nov. 15, 2021, provisional application No. 63/209,861, filed on Jun. 11, 2021.

(51) Int. Cl.
  H02J 7/14 (2006.01)
  B60P 1/44 (2006.01)

(52) U.S. Cl.
  CPC .............. H02J 7/342 (2020.01); H02J 7/345 (2013.01); H02J 2207/20 (2020.01)

(56) References Cited

U.S. PATENT DOCUMENTS

| | | |
|---|---|---|
| 6,518,733 B1 | 2/2003 | Schenkel et al. |
| 6,765,312 B1 | 7/2004 | Urlass et al. |
| 6,799,070 B2 | 9/2004 | Wolfe et al. |
| 7,077,209 B2 | 7/2006 | McCulloch et al. |
| 7,119,518 B1 | 10/2006 | Dougherty et al. |
| 7,193,390 B2 | 3/2007 | Nagai et al. |
| 7,362,005 B2 | 4/2008 | Leblanc |
| 7,548,409 B2 | 6/2009 | Kojima et al. |
| 7,633,271 B2 | 12/2009 | Schulte et al. |
| 7,667,432 B2 | 2/2010 | West et al. |
| 7,782,016 B2 | 8/2010 | Kang et al. |
| 7,887,943 B2 | 2/2011 | Yoshikane et al. |
| 8,519,821 B2 | 8/2013 | Ablabutyan |
| 8,655,574 B2 | 2/2014 | Izumoto et al. |
| 8,751,116 B2 | 6/2014 | Bark et al. |
| 8,798,871 B2 | 8/2014 | Lugash et al. |
| 8,886,425 B2 | 11/2014 | Doering et al. |
| 9,272,627 B2 | 3/2016 | Miller |
| 9,616,796 B2 | 4/2017 | Russo et al. |
| 9,627,908 B2 | 4/2017 | Kaminsky et al. |
| 9,803,609 B2 | 10/2017 | Setterberg et al. |
| 9,833,223 B2 | 12/2017 | Wood et al. |
| 9,892,868 B2 | 2/2018 | Pyzza et al. |
| 9,899,643 B2 | 2/2018 | Pyzza et al. |
| 9,991,060 B2 | 6/2018 | Bouchard et al. |
| 10,065,523 B2 | 9/2018 | Wood et al. |
| 10,153,096 B2 | 12/2018 | Xi et al. |
| 10,242,808 B2 | 3/2019 | Eilertsen et al. |
| 10,596,913 B2 | 3/2020 | Healy et al. |
| 10,654,369 B2 | 5/2020 | Healy |
| 10,668,825 B2 | 6/2020 | Wood et al. |
| 10,668,831 B2 | 6/2020 | Hudson |
| 10,688,903 B2 | 6/2020 | Marji et al. |
| 10,710,525 B2 | 7/2020 | Pierce et al. |
| 10,723,182 B2 | 7/2020 | Lesesky et al. |
| 10,744,888 B2 | 8/2020 | Healy et al. |
| 10,821,853 B2 | 11/2020 | Healy et al. |
| 10,967,742 B2 | 4/2021 | Healy |
| 10,981,487 B1 | 4/2021 | Russo |
| 11,046,192 B2 | 6/2021 | Aufdencamp |
| 11,069,488 B2 | 7/2021 | Johnson et al. |
| 11,165,266 B2 | 11/2021 | Johnson et al. |
| 11,273,716 B2 | 3/2022 | Matsuda et al. |
| 11,281,982 B2 | 3/2022 | Cristache |
| 11,293,394 B2 | 4/2022 | Banerjee et al. |
| 11,303,139 B2 | 4/2022 | Hinterberger et al. |
| 11,303,980 B2 | 4/2022 | Chng et al. |
| 2003/0151875 A1 | 8/2003 | Nguyen et al. |
| 2007/0090808 A1 | 4/2007 | McCabe et al. |
| 2007/0132313 A1 | 6/2007 | Baeuerle |
| 2009/0314561 A1 | 12/2009 | Handa |
| 2010/0097029 A1* | 4/2010 | McCabe ................ B60L 50/40 320/103 |
| 2010/0148582 A1 | 6/2010 | Carter |
| 2012/0237799 A1 | 9/2012 | Jiang et al. |
| 2013/0031318 A1 | 1/2013 | Chen et al. |
| 2013/0264875 A1* | 10/2013 | Kaminsky ................ H01G 9/28 307/52 |
| 2014/0041179 A1 | 2/2014 | Bradley et al. |
| 2015/0240939 A1 | 8/2015 | Ge |
| 2016/0243960 A1 | 8/2016 | Wood et al. |
| 2016/0297317 A1 | 10/2016 | Huang et al. |
| 2017/0063104 A1 | 3/2017 | Bean |
| 2018/0249517 A1 | 8/2018 | Park et al. |
| 2019/0176650 A1 | 6/2019 | Wood et al. |

\* cited by examiner

SUPER CAPACITOR BASED POWER MODULE FOR LIFT GATE

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

STATEMENT OF RELATED APPLICATIONS

This application claims the benefit of U.S. Ser. No. 63/209,861 filed Jun. 11, 2021. That application is entitled "Super Capacitor Based Power Module for Lift Gate."

This application also claims the benefit of U.S. Ser. No. 63/279,525 filed Nov. 15, 2021. That application is entitled "Super Capacitor Based Power System for Delivery Vehicle."

This application is further filed as a continuation-in-part of U.S. Ser. No. 17/690,784 filed Mar. 9, 2022. That application is entitled "Super Capacitor Based Power System for Delivery Vehicle."

Each of these applications is incorporated herein in its entirety by reference.

BACKGROUND OF THE INVENTION

This section is intended to introduce selected aspects of the art, which may be associated with various embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of power generation for mobile units. More specifically, the present invention relates to a hybrid super-capacitor and battery system used for supporting the operation of a lift gate associated with a truck or other delivery vehicle.

DISCUSSION OF TECHNOLOGY

Batteries are frequently used in cars, trucks, boats and other vehicles as a way of providing the initial charge for an internal combustion engine. The battery provides electricity needed for the starter to start the vehicle. In operation, the operator of the vehicle will activate the ignition switch (such as by pressing a button in the cab or by inserting and turning a key). The ignition switch controls a starter relay (also called a solenoid), allowing a pair of contacts to close. When the contacts close, the battery sends a voltage to the starter motor, which turns gears to start the engine for the vehicle.

The same battery is also used to provide power for electrical devices associated with the vehicle. These include headlights, air conditioning, heating, dome lights, and other onboard electrical systems.

It has long been known to include an alternator on a vehicle to provide support for the battery. The alternator includes a rotor shaft that is turned by a pulley and drive belt system. When the engine is started, the pulley turns the rotor shaft, causing the rotor to act as a spinning electro-magnet. As the pulley is rotated, alternating current (AC) passes through a magnetic field and an electrical current is generated. Thus, when the car is running, the alternator generates energy to both feed the electrical system of the vehicle and to maintain charge in the battery.

The electrical energy generated by the alternator and battery together must be adequate to support the vehicle's so-called hotel load. The term "hotel load" refers to the non-driving energy demands on a vehicle. This may include energy used for lights, air conditioning, heating, geo-tracking systems, computers and safety systems. The larger the charge that is needed to start a vehicle and to assist in supporting hotel load, the larger the battery (measured in kilo-watt hours) that is required.

Some vehicles, particularly delivery trucks, include a lift gate. A life gate is an add-on feature typically used to lift loads onto and off of the truck. Specifically, the lift gate enables freight to be lifted from the ground to the height of the truck's tailgate, or from the bed of the truck down to the ground. Trash trucks also use a lift gate system, except in this instance the lift gate picks up a trash container and raises the trash container into an inverted position over a dump trailer associated with the truck.

The lift gate is powered by an independent DC battery located at a rear of the truck and proximate the lift gate. The load demand on these rear batteries is high. To make matters worse, the battery used to power the lift gate resides a long way from the alternator, which remains "under the hood." The lift gate battery does not receive enough voltage for recharging due to the long cable lengths and problems associated with line loss. As a result, the operator is required to frequently replace the batteries. Alternatively, the operator may add a second battery, with the two rear batteries being placed in parallel as a way of extending battery life. This latter option adds expense.

The problem of battery run-down can be aggravated by temperature extremes, particularly drops in temperature. Battery run-down can also be aggravated if the truck engine is not "turned over" for a period of time, or if the truck has not had sufficient time to recharge the batteries between stops.

A problem sometimes faced by operators of trucks having a lift gate occurs when the battery goes out while the lift gate is in use. In some cases, this means that the lift gate is stuck in a position that makes the truck impossible to drive. In a worst case scenario, the lift gate is supporting a physical load when the battery goes out. The operator must then request a costly service call.

Therefore, a need exists for a means of supporting the rear battery of a truck, enabling the battery to be recharged more effectively and extending its life. A need further exists for a power system for a delivery truck or other working truck where banks of ultra-capacitors are used to augment the rear-battery service for lift gate energy.

SUMMARY OF THE INVENTION

A hybrid power module for a lift gate system is provided herein. The lift gate is associated with a truck, such as a delivery vehicle. The delivery vehicle has an engine compartment and a cargo compartment. In addition, the delivery vehicle is fitted with a lift gate system. The truck may have a separate trailer, but preferably the vehicle is a so-called city delivery truck where the engine compartment, the cab and the cargo compartment all reside on a shared chassis.

The delivery truck will include an engine and an alternator. Each of the engine and the alternator is located at a front of the truck, that is, within the engine compartment. The alternator serves as a source of AC power. As noted, the delivery truck will also include a lift gate. The lift gate resides at the back of the truck, and is typically secured to the framing of the cargo compartment, or optionally a back tail gate.

The hybrid power module represents a combined capacitor and battery. Optionally, the capacitor and battery are in modular form such that the capacitor and the battery may be individually selected based on application needs, and then mechanically combined into a single electrical energy storage device.

In one aspect, the power module comprises a first battery. The first battery may be, for example, a lead acid battery as known for providing power to a motor for a lift gate. Alternatively, the first battery may be a lithium-ion battery (or "LIB").

The hybrid power module also includes a super capacitor. The super capacitor is made up of a bank of ultra-capacitors. In one aspect, the super capacitor comprises 12 ultra-capacitors yielding a total capacitance of at least 1,000 Farads. The ultra-capacitors may be configured in a 6×2 array, providing two parallel sets of six capacitors, in series.

The hybrid power module further comprises an integrated DC/DC boost converter. The DC/DC converter includes an input side and an output side. The input side is connected to electrical cables that extend from the alternator, while the output side is in electrical communication with the bank of ultra-capacitors. Thus, the super capacitor is in electrical communication with and is charged (or maintained) by the alternator of the truck.

The hybrid power module also includes a switch, and electrical wiring forming an electrical circuit that includes the switch. The electrical wiring may be a harness that connects the capacitor bank and the first battery to the switch, and also connects the switch to a motor for the lift gate. The super capacitor and the first battery reside proximate the lift gate. In other words, they are not under the hood with the vehicle battery.

Preferably, the super capacitor and the first battery are positioned in parallel within the electrical circuit. Preferably, the super capacitor contains enough energy to power the electric motor for the lift gate through at least two operating cycles without the first battery.

In one arrangement, the hybrid power module further comprises a lift gate capacitor box. The lift gate capacitor box holds the bank of ultra-capacitors, the first battery, and the DC/DC converter. The lift gate capacitor box also holds a current control, which regulates current that reaches the DC/DC converter.

The DC/DC converter may be placed between the current control and the bank of ultra-capacitors. The DC/DC converter bumps up charge sent from the alternator into the capacitor bank. In one aspect, the DC/DC converter is configured to boost voltage from 8 volts DC to 14.5 volts DC.

A method for operating a lift gate is also provided herein. In one aspect, the method first comprises providing a delivery vehicle. The delivery vehicle will have an alternator and a combustion engine, each of which resides within an engine compartment, or "under the hood." The alternator serves as a source of AC power for a relay that starts the engine.

The delivery vehicle will also have a cargo compartment, with the cargo compartment being fitted with the lift gate. Preferably, the lift gate resides along back framing of the delivery vehicle, or optionally is secured to a back tail gate.

Residing on or in the cargo compartment is a hybrid power module. The power module is in accordance with the power module described above, in its various embodiments. In this respect, the power module comprises a capacitor and a rear battery. The capacitor and the rear battery are positioned in parallel within an electrical circuit.

The rear battery may be, for example, a lead acid battery as known for providing power to a motor for a lift gate. Alternatively, the rear battery may be a lithium-ion battery (or "LIB"). The capacitor, in turn, is a super capacitor. The super capacitor is made up of a bank of capacitors. In one aspect, the bank of capacitors comprises 12 ultra-capacitor cells in series yielding a total capacitance of at least 1,000 Farads. The bank of capacitors may be configured in a 6×2 array, providing two parallel sets of six ultra-capacitors, in series.

The power module further comprises an integrated DC/DC boost converter. The DC/DC converter includes an input side and an output side. The input side is connected to electrical cables that extend from the alternator, while the output side is connected to the bank of ultra-capacitors. Thus, the ultra-capacitors are in electrical communication with and are charged by the alternator of the truck. The super capacitor is configured to support peak currents in the liftgate motor when the liftgate motor is in operation.

The method also includes sending a signal to operate the lift gate. Preferably, an electric motor is associated with the lift gate. Sending a signal to operate the lift gate comprises sending an electrical signal from the power module that causes the lift gate to be raised or to be lowered.

In one aspect, the method further comprises operating the delivery vehicle for a period of time in order to spin the alternator. This, in turn, charges (or re-charges) the first bank of capacitors within the power module.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 5 illustrates the use of ultra-capacitors. It can be seen that a 6×2 array of ultra-capacitor cells is provided.

DETAILED DESCRIPTION OF CERTAIN EMBODIMENTS

Figure 1A:
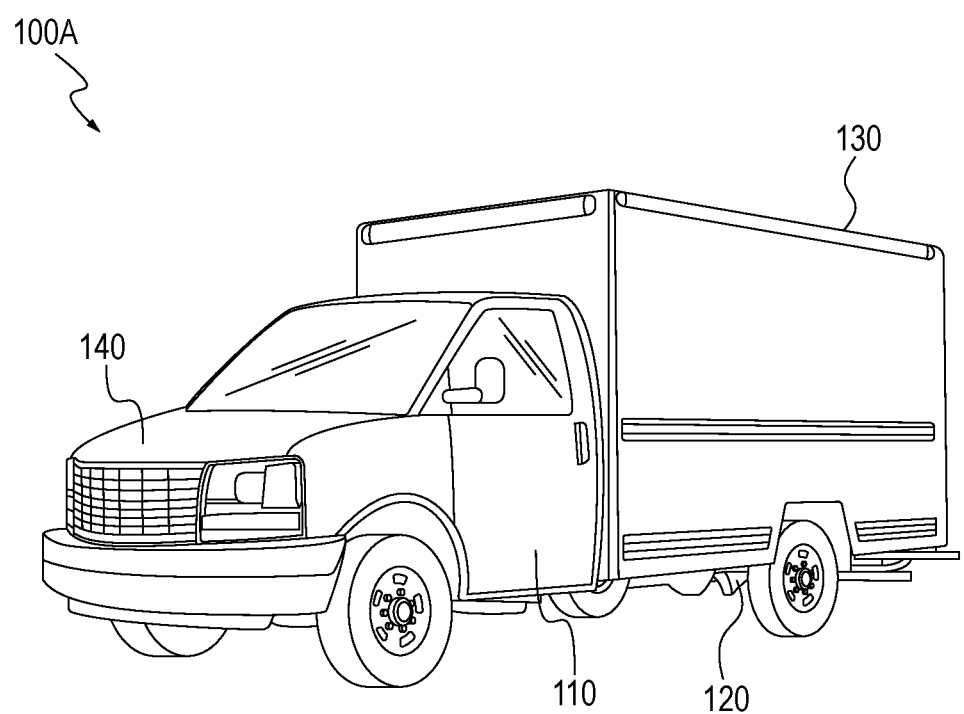
FIG. 1A is a perspective view of a city delivery truck, in one embodiment. This particular truck is a medium duty, multi-stop truck.

FIG. 1A is a perspective view of a city delivery truck 100A. This particular truck 100A is a medium duty, multi-stop delivery truck. Such trucks are commonly used for local deliveries and can be driven without a commercial driver's license in most states.

Figure 1B:
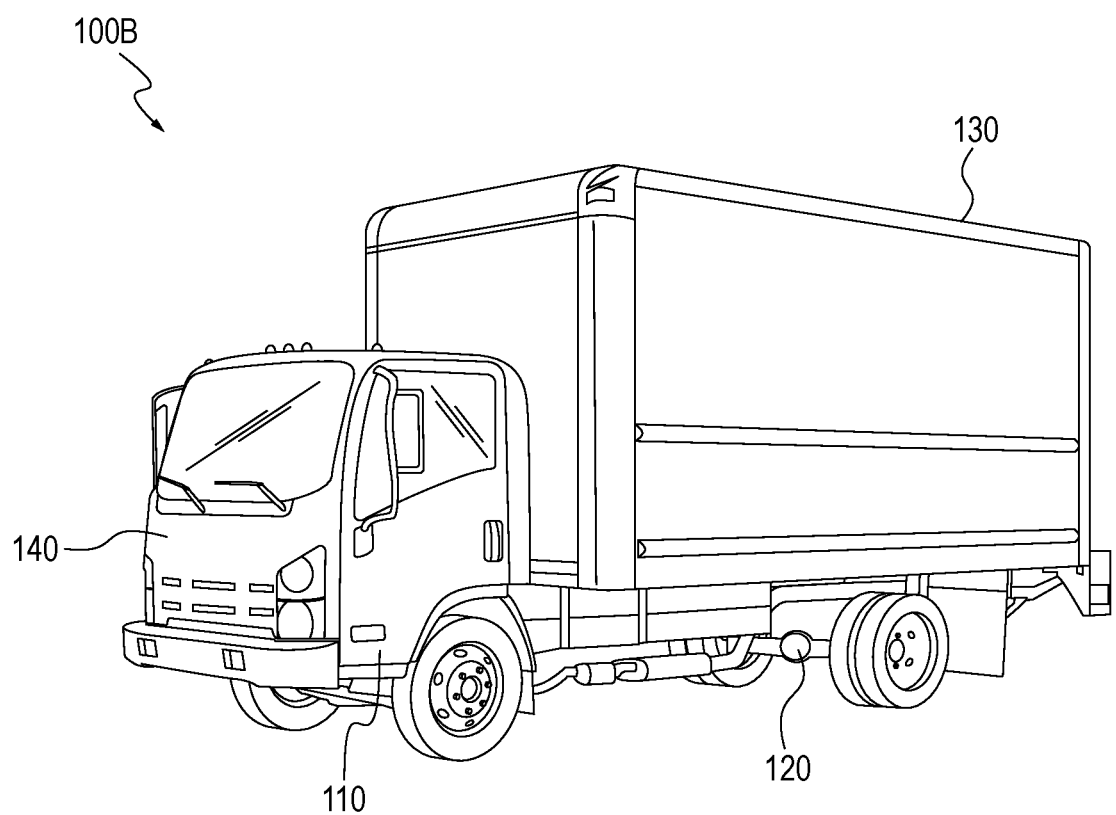
FIG. 1B is another perspective view of a city delivery truck. This particular truck is a so-called light duty box truck.

FIG. 1B is another perspective view of a city delivery truck 100B. This particular truck 100B is a so-called light duty box truck. Alternatively, this truck may be referred to as a "hi-cube" truck. Such trucks are also frequently used for local deliveries.

Figure 1C:
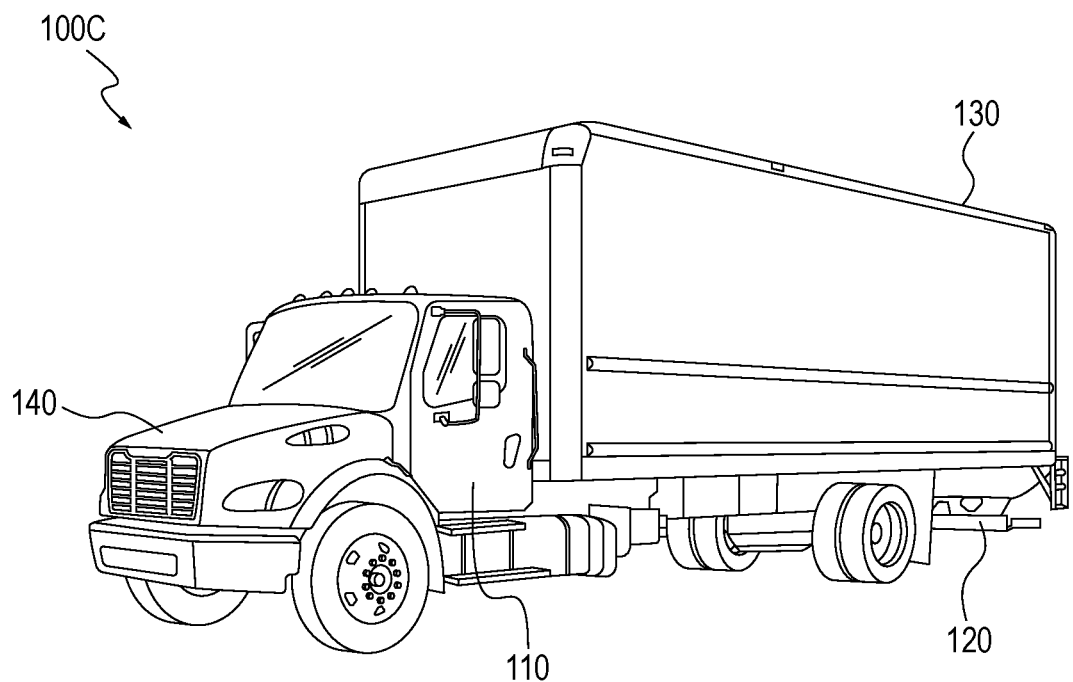
FIG. 1C is another perspective view of a city delivery truck. This particular truck is a medium duty truck.

FIG. 1C is another perspective view of a city delivery truck 100C. This particular truck 100C is a medium duty, long box truck. Such trucks come in both CDL and non-CDL configurations and are used for the delivery of heavier items such as refrigerators and mechanical equipment. Note that the cargo compartment of the truck 100C is longer than the cargo compartment of the truck of 100B.

Figure 1D:
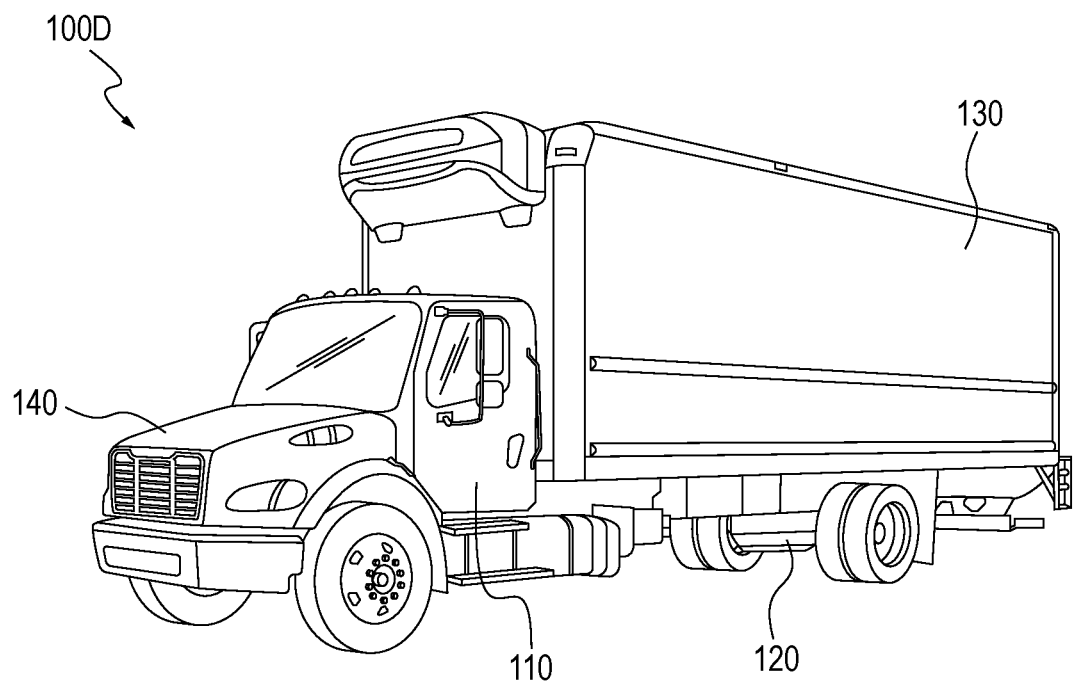
FIG. 1D is another perspective view of a city delivery truck. This particular truck is a refrigerated truck.

FIG. 1D is another perspective view of a city delivery truck 100D. This particular truck is a refrigerated truck.

Each of trucks 100A, 100B, 100C and 100D is known and ubiquitously used in the transportation and shipping industries. Such trucks are available, for example, from Penske System, Inc. of Bloomfield Hills, Michigan. Each truck 100A, 100B, 100C, 100D includes a cab 110, a chassis 120 and a cargo compartment 130. In the case of trucks 100A, 100B, 100C, the cargo compartment 130 is mounted on the same chassis 120 as the cab 110. In the case of truck 100D, the cargo compartment 130 includes a refrigeration system. The cargo compartment 130 of truck 100D may optionally be located on a trailer that is separate from the chassis 120.

In each truck 100A, 100B, 100C, 100D, the cargo compartment 130 is enclosed although it is known to have open, flatbed trucks. Each truck 100A, 100B, 100C, 100D also includes an engine compartment 140. The engine compartment 140 holds the engine, an engine cooling system and a power system (not shown) for the vehicle. The power system will include at least one battery, an alternator, and a DC bus.

It is observed that car batteries operate on one-way direct current electricity, while alternators output alternating current electricity.

Figure 2A:
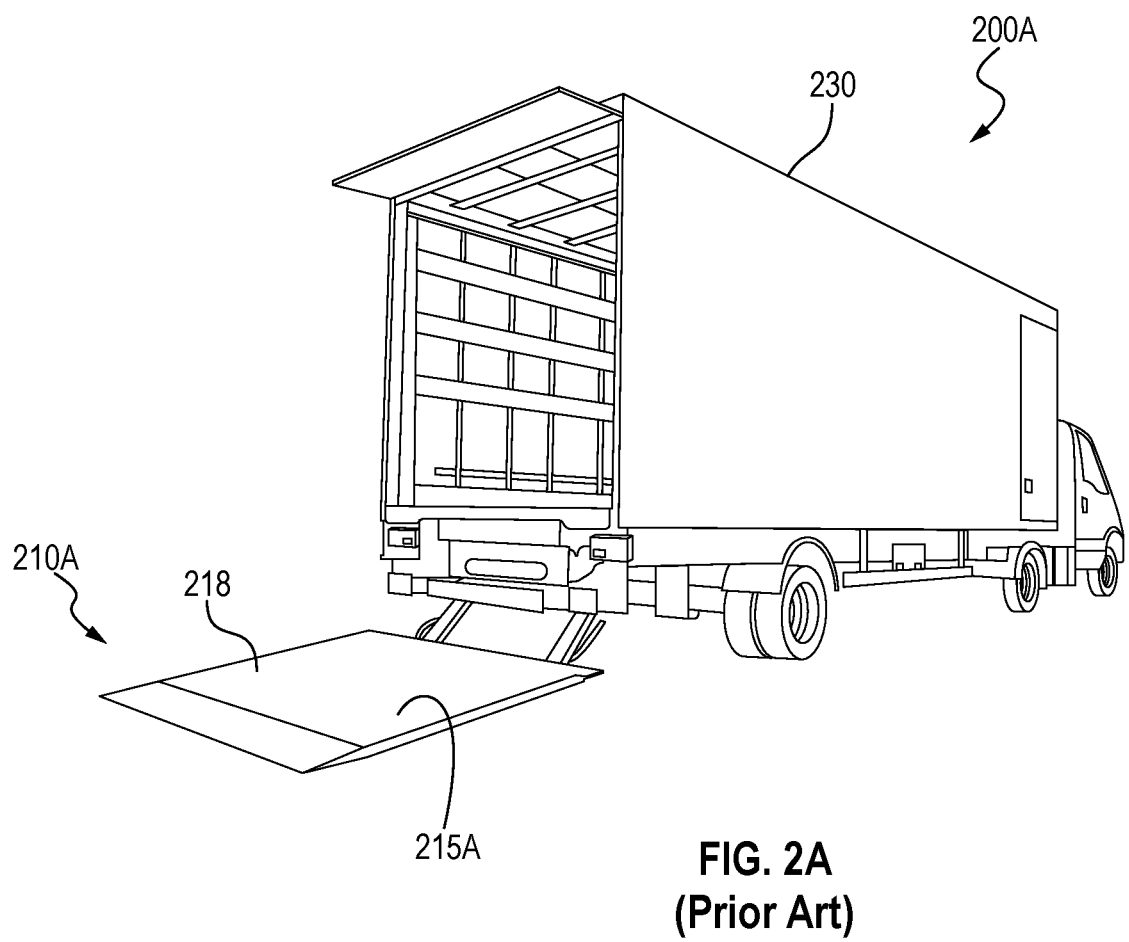
FIG. 2A is a perspective view of a medium duty truck such as the truck of FIG. 1C. Here, the view is taken from the rear of the truck. It can be seen that the truck has been fitted with a lift gate. In this view, the lift gate has been moved into a lowered position.

FIG. 2A is a perspective view of a medium duty truck 200A. Truck 200A may be in accordance with the truck 100C of FIG. 1C. Here, the view is taken from the rear of the truck 200A. It can be seen that the truck 200A has been fitted with a lift gate 215A. In this view, the lift gate 215A has been moved into a lowered position 210A.

It is observed that most lift gates can lift up to 5,000 pounds. Lift gates are commonly controlled by a so-called switch box that resides inside the cargo compartment 230. The switch box is used to control the electric motor that moves the lift gate 215A.

Figure 2B:
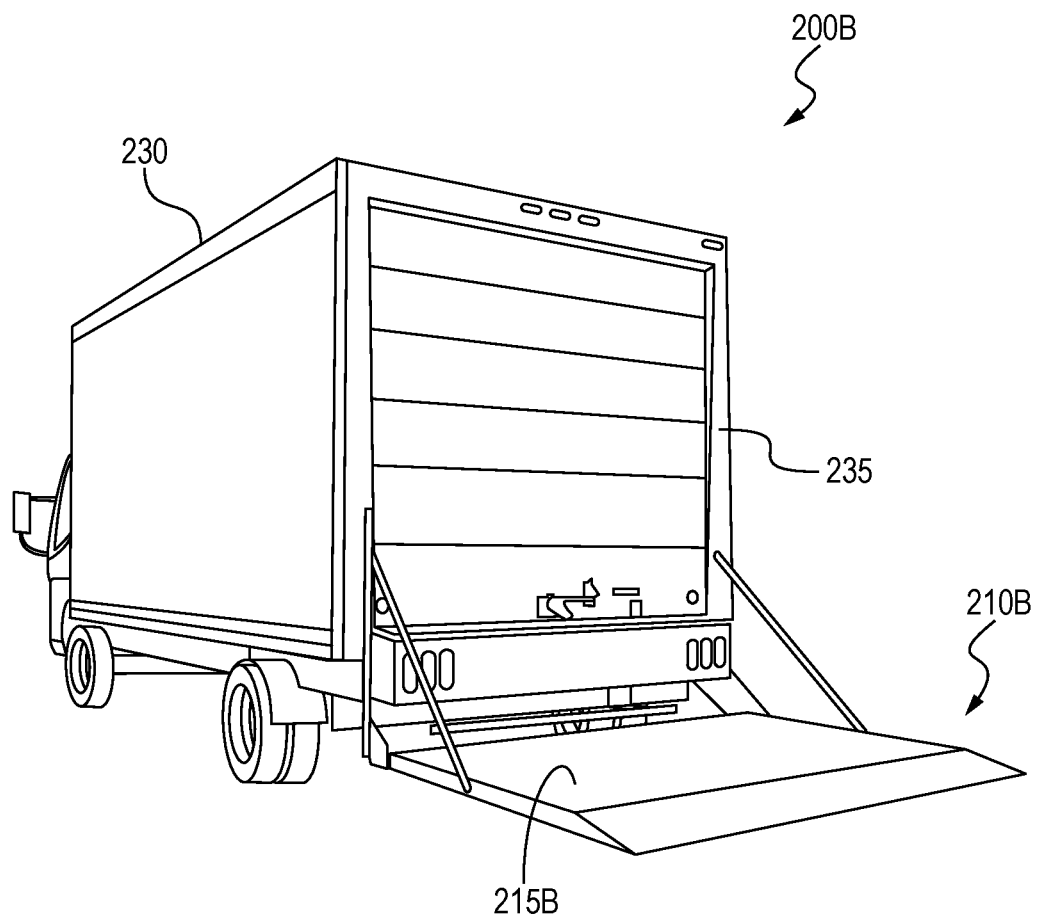
FIG. 2B is a perspective view of a light duty box truck such as the truck of FIG. 1B. The view is again taken from the rear of the truck. It can be seen that the truck has been fitted with a lift gate, with the lift gate being actively moved into a lowered position.

FIG. 2B is a perspective view of a light duty box truck 200B. Truck 200B may be in accordance with the truck 100B of FIG. 1B. The view is again taken from the rear of the truck 200B. It can be seen that the truck 200B has also been fitted with a lift gate 215B. Specifically, the lift gate 215B is mounted onto the framing 235 of the cargo compartment 230. In this view, the lift gate 215B is being moved into its lowered position 210B.

Figure 2C:
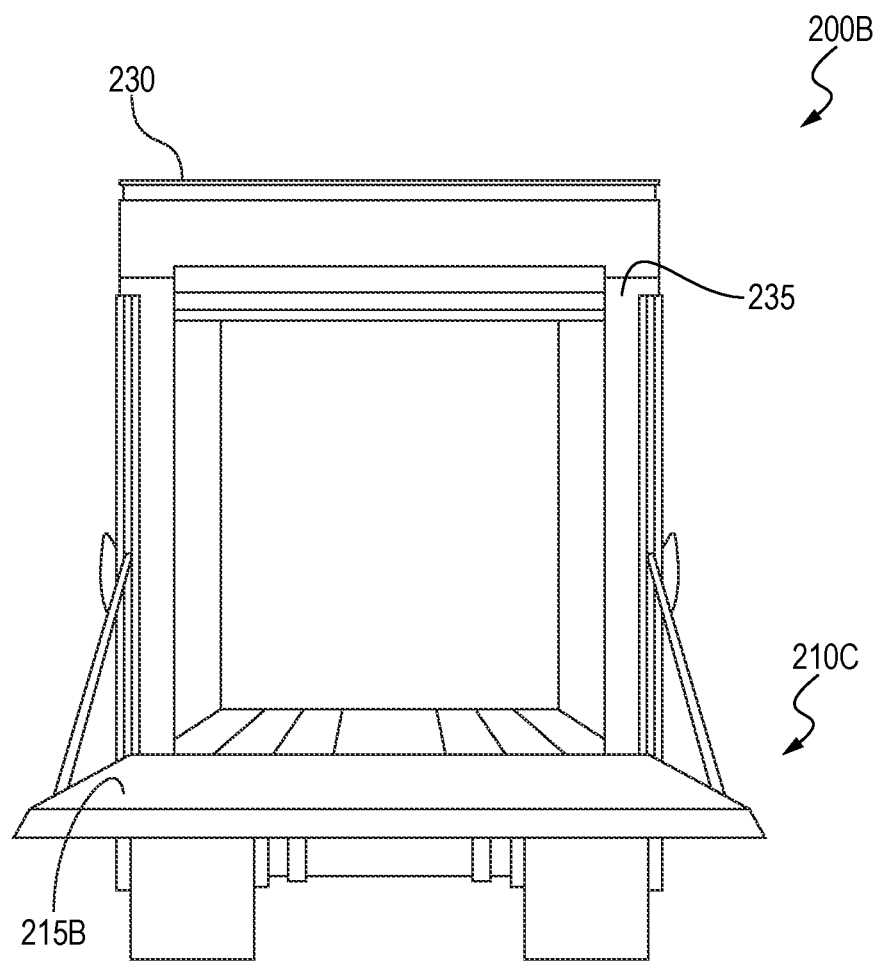
FIG. 2C is a perspective view of a medium duty truck of FIG. 1A. The view is again taken from the rear of the truck. It can be seen that the truck has been fitted with a lift gate, with the lift gate having been moved into its fully raised position.

FIG. 2C is a rear plan view of the truck 200B of FIG. 2B. In this view, the lift gate 215B has been moved into its raised position 210C. In this raised position 210C, cargo may be readily moved between the back bed of the cargo compartment 230 and the platform of the lift gate 215B. Of interest, this particular lift gate 215B is a so-called rail lift gate, meaning that it is mounted using vertical rails. The rails are secured to the framing 235 as is known in the art.

Figure 2D:
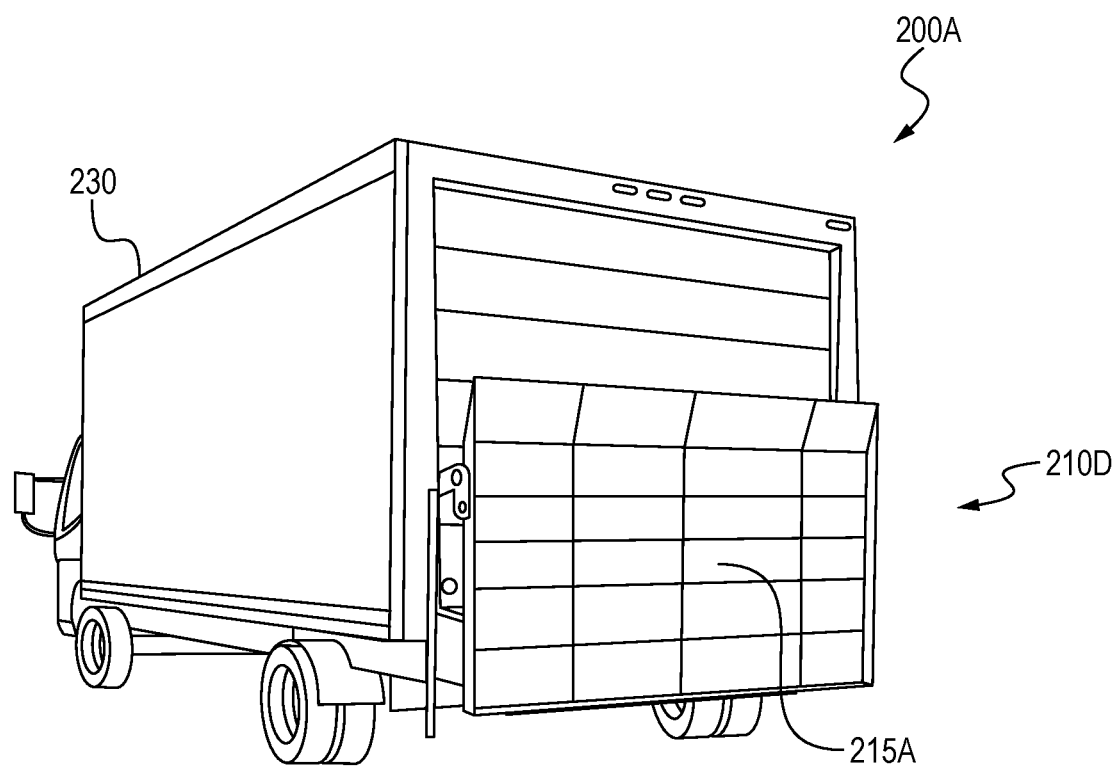
FIG. 2D is another rear, perspective view of the medium duty truck of FIG. 2A. Here, the lift gate has been folded into a transport position.

FIG. 2D is a rear, perspective view of the medium duty truck 200A of FIG. 2A. Here, the lift gate 215A has been folded into a transport position 210D.

Each of the lift gates 215A and 215B resides at a rear of its respective truck 200A, 200B. Each of the lift gates 215A, 215B is known and used in the transportation and shipping industries, and is powered by means of a battery. Typically, the battery is the vehicle battery that resides under the hood. The vehicle battery is used to both start the engine and drive the liftgate motor. This places undue strain on the battery. Alternatively, a separate battery is provided to drive the liftgate motor. In known arrangements, this separate (or rear) battery shares electrical support from the alternator but otherwise operates on its own.

Figure 3:
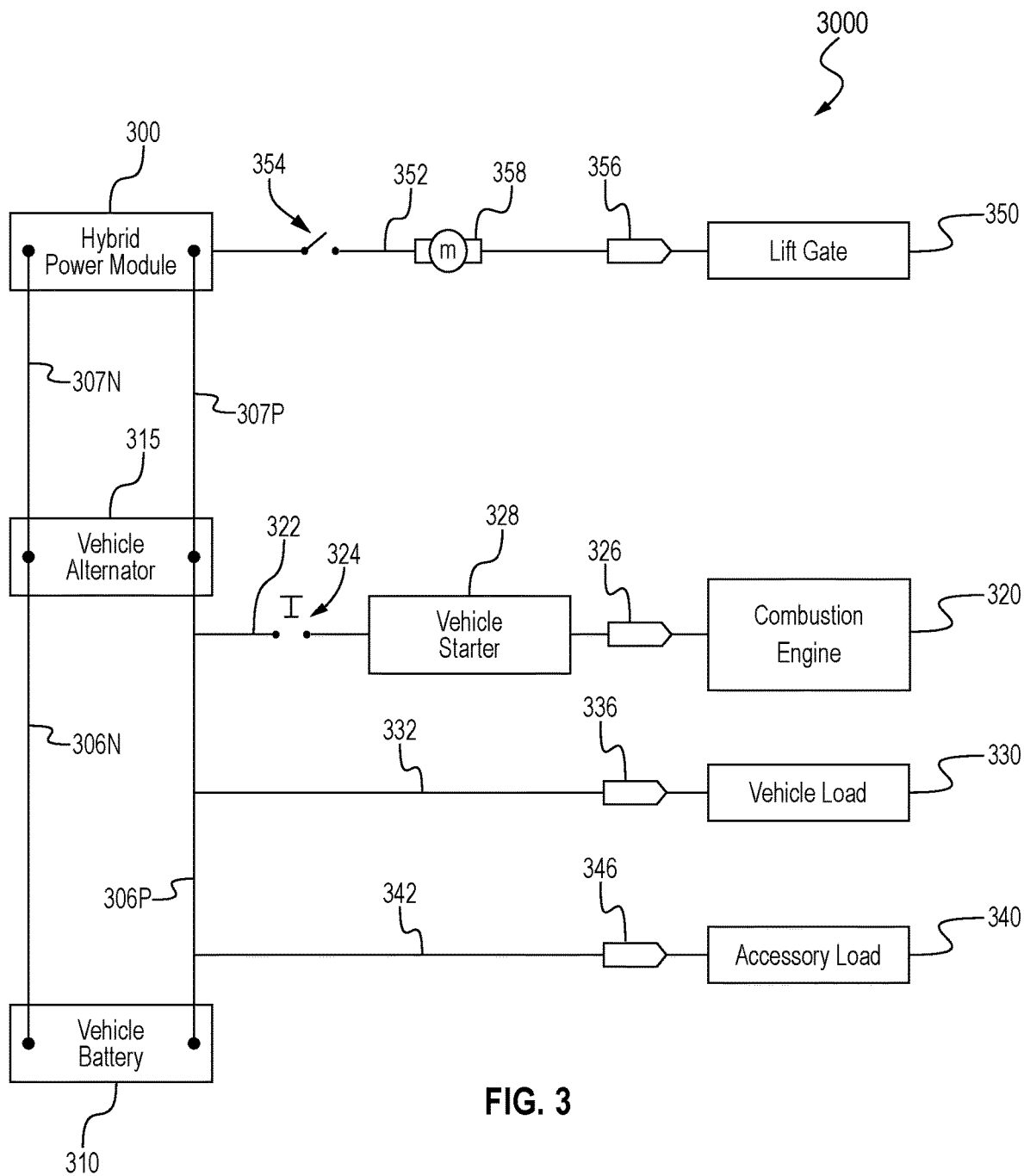
FIG. 3 is a circuit diagram illustrating an electrical system for a delivery vehicle, in one example. In this case, the delivery vehicle includes a lift gate powered by a liftgate motor. A vehicle alternator is in electrical communication with a hybrid power module, shown schematically.

FIG. 3 is a diagram illustrating an electrical system 3000 for a truck. The truck may be any truck having a liftgate motor, including any of the illustrative trucks 100A, 100B, 100C, 100D, 200A, or 200B presented above. The electrical system 3000 is ideally intended for a city delivery truck. However, the present disclosure is not limited to such an arrangement unless expressly stated in the claims.

The electrical system 3000 first includes a vehicle battery 310. This is a typical lead-acid battery as commonly used in delivery vehicles. The battery 310 will have positive and negative terminals.

The electrical system 3000 also includes a vehicle alternator 315. The alternator 315 is in electrical communication with the battery 310 by means of wires 306. These may be a negative bus 306N and a positive bus 306P.

The alternator 315 serves as an AC voltage source. The battery 310 and the alternator 315 are in electrical communication with a starting relay 324 (or relay start) by means of wire 322. When the relay start 324 is closed, power is sent to a starter 328 to start (or "crank") a vehicle engine 320. Bus 326 is provided to connect cable 322 to the engine 320. It is noted that the starter 328 itself is a small motor, powered by the battery 310 through cable 322.

Energy from the battery 310 and the alternator 315 support vehicle loads 330 and accessory loads 340. Vehicle loads 330 generally refers to the hotel load internal to the vehicle, while accessory loads 340 generally refers to external loads that may be carried by the vehicle, such as lighting for a trailer or aftermarket parts.

Wire 332 extends from cable 306 (either 306P or 306N) to bus 336, to provide energy to the vehicle load 330. At the same time, wire 342 extends from cable 306 (either 306P or 306N) to bus 346 to provide energy to the accessory load 340.

In the illustrative arrangement of FIG. 3, the alternator 315 is also in electrical communication with a hybrid power module 300. This is done using positive 307P and negative 307N cables. The cables 307P, 307N may be lengthy, extending from a front of the truck to a rear of the truck. The cables 307P, 307N may be, for example, between 20 and 60 feet in length, extending to a back of a cargo compartment.

The delivery vehicle is outfitted with a lift gate 350. A heavy duty wire 352 extends from the power module 300 to a switch 354. The switch 354 is controlled by an operator using an operator interface for cycling a lift gate platform up and down. The switch 110 is manually operated by an operator, and may include a panel with operating switches or buttons as part of a switch box. Typically, the operator interface, or switch box, resides at the back of the delivery vehicle.

When the switch 354 is moved into an "On" position, power is supplied to a liftgate motor 358. The liftgate motor 358 is located at the back of the cargo compartment 230 adjacent the lift gate 350. The switch 354 may be placed in a "Raise" position to cause the motor 358 to activate the lift gate 350 through bus 356 and to raise the platform of the lift gate. The switch 354 may also be placed in a "Lower" position to cause the motor 358 to activate the lift gate 350 through bus 356 and to lower the platform of the lift gate.

It is understood that the liftgate motor 358 may comprise more than one motor. For example, the liftgate motor 358 may include a main drive motor, a latch release motor, and a latch cinch motor. The main drive motor moves the lift gate 350 up and down when a clutch is engaged. The latch release motor releases the lift gate for lowering the platform, while the latch cinch motor locks the lift gate 350 in place for driving when the lift gate platform is raised.

In one aspect, when the platform of the lift gate 350 is to be moved up, audible and visual feedback is provided to indicate that the door will be closing. After one second, the clutch is engaged and the liftgate motor 358 is driven in the close direction (the Raised position). When the lift gate 350 reaches the secondary latch position, the main drive motor is turned off and the clutch is disengaged. The latch cinch motor is then engaged to pull the lift gate 350 to the primary latch position. Once the primary latch position is reached, the latch cinch motor is turned off.

When the lift gate 350 is to be moved down, visual feedback may be provided via illumination of interior lights within the cargo compartment. The liftgate latch release motor is driven in the release direction. Once the latch has been released, the clutch is engaged and the main drive motor is driven in the open direction (the Lower position). When the platform of the lift gate 350 is within approximately three degrees of the full open position, the main drive motor is turned off and the clutch is disengaged. Lift gate struts may push the lift gate 350 the remainder of travel to the full open (or Lower) position.

In one aspect, the liftgate motor 358 will have a cutoff when the lift gate 350 has reached a position where it is fully raised or fully lowered. Preferably, all motor activation functions are disabled when the delivery truck transmission is in any position other than park.

Returning to FIG. 3, and as described further below, the hybrid power module 300 includes a bank of capacitors 330 and a first rear battery 450. Preferably, the hybrid power module 300 also includes a second rear battery 460. Electrical components of the power module 300 may be solid state. As understood in the art of electronics, solid-state components, including field-effect transistors (FETs) and insulated gate bipolar transistors (IGBT), tend to be faster, more reliable, and consume less power than relays and contactors.

Figure 4:
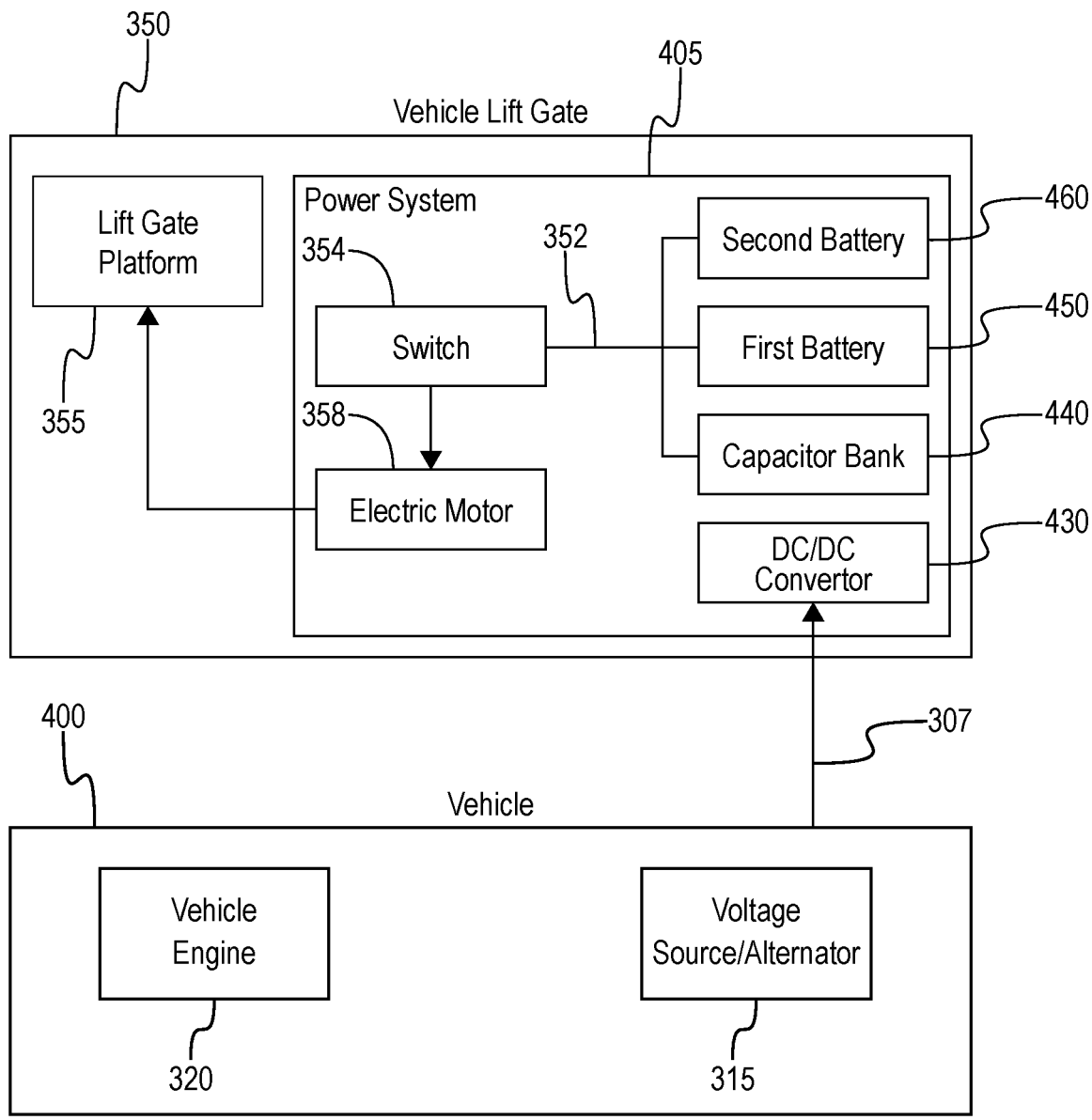
FIG. 4 is a diagram illustrating a vehicle having a lift gate. A power system for operating the lift gate is shown schematically.

FIG. 4 is a diagram illustrating a vehicle 400. The vehicle 400 includes an engine 320 and a voltage source 315. The voltage source is likely an alternator, such as the alternator 315 of FIG. 3. The vehicle 400 also includes a lift gate 350. The lift gate 350 has a lift gate platform 355.

In order to operate the lift gate platform 355, a power system 405 is provided. The power system 405 includes the switch 354 and the electric motor 358 of FIG. 3. In this arrangement, power from the alternator 315 is "thiefed" through cables 307 in order to provide electrical support to the power system 405.

The power system 405 also includes at least a first rear battery 450. In the arrangement of FIG. 4, an optional second rear battery 460 is also provided. The power system 405 also includes a bank of capacitors 440. The capacitor bank 440 resides in parallel with the batteries 450, 460. Together with the batteries 450, 460, the bank of capacitors 440 provides power to the electric motor 358 via the switch 354. The electric motor 358, in turn, moves the lift gate platform 355 through raised and lowered position cycles.

Components of the power system 405 are connected through electrical wiring 352, forming an electrical circuit. The electrical wiring 352 may be a harness that connects the capacitor bank 440 and the first battery 450 to the switch 354, and also connects the switch 354 to the motor 358 for the lift gate platform 355.

The lift gate platform 355 and the power system 405 are generally located proximate a back of the truck 200. This means that the bank of capacitors 440 and the first battery 450 reside proximate the lift gate 350. Alternator cables 307 extend from the alternator 315 to the power system 405 in the back.

It is noted that the capacitors in the bank of capacitors 440, and the batteries 450, 460 are both used for storing electrical charge. However, they operate in quite different ways.

The electrodes in the batteries 450, 460 are separated by a chemical substance called an electrolyte. Electrical energy is released in response to a chemical reaction involving the electrodes and the electrolyte. Once the chemicals have been depleted, the reactions stop and the battery is no longer able to provide a charge. Batteries 450, 460 generally are not rechargeable, or to the extent they are, charging is quite slow and limited. Some batteries are rechargeable. A well-known example is the lithium-ion power pack used for laptop computers and small, portable electronic devices, and all the way up to electric vehicles. In these batteries, the electricity-inducing reactions run between the terminals in either direction. The result is that the battery can be charged and discharged hundreds of times before replacing. However, charging a battery is slow.

Capacitors, on the other hand, can be charged (or re-charged) almost instantly. Capacitors weigh less than batteries and typically do not contain chemicals or toxic metals.

The downside though is that capacitors can store only small amounts of power. Capacitors use static electricity (or electrostatics) rather than chemistry to store energy. A capacitor utilizes two opposing conducting metal plates with an insulating material there between. The insulating material is referred to as a dielectric. Positive and negative electrical charges build up on the plates, preventing them from coming into contact. The dielectric allows a capacitor of a certain size to store more charge at the same voltage.

Some capacitators are referred to as super-capacitors. A super-capacitor (or ultra-capacitor) differs from an ordinary capacitor in that its plates effectively have a much bigger surface area and the distance between them is much smaller. In the case of a super-capacitor, the plates are made from a metal coated with a porous substance such as powdery, activated charcoal. The porosity provides the greater surface area for storing more charge, providing more Farads. Also of interest, in a super-capacitor there is no dielectric material per se; instead, both plates are soaked in an electrolyte and separated by a very thin insulator.

When the plates are charged, an opposite charge forms on either side of the separator, creating what is called an electric double-layer. The double-layer is extremely thin, perhaps only one molecule thick (compared to a dielectric that might range in thickness from a few microns to a millimeter or more in a conventional capacitor). For this reason, super-capacitors are sometimes referred to as double-layer capacitors, or electric double-layer capacitors ("EDLC's").

The capacitance of a capacitor increases as the area of the opposing plates increases and also as the distance between the plates decreases. Capacitors have many advantages over batteries. As noted above, they generally weigh less. They can also be charged and discharged hundreds of thousands of times without wearing out. However, by design they are unable to store a charge as do batteries, or at least not a usable charge. Beneficially, the voltage delivered by a super-capacitor can be scaled by increasing or decreasing the number of ultra-capacitors placed in series.

Figure 5:
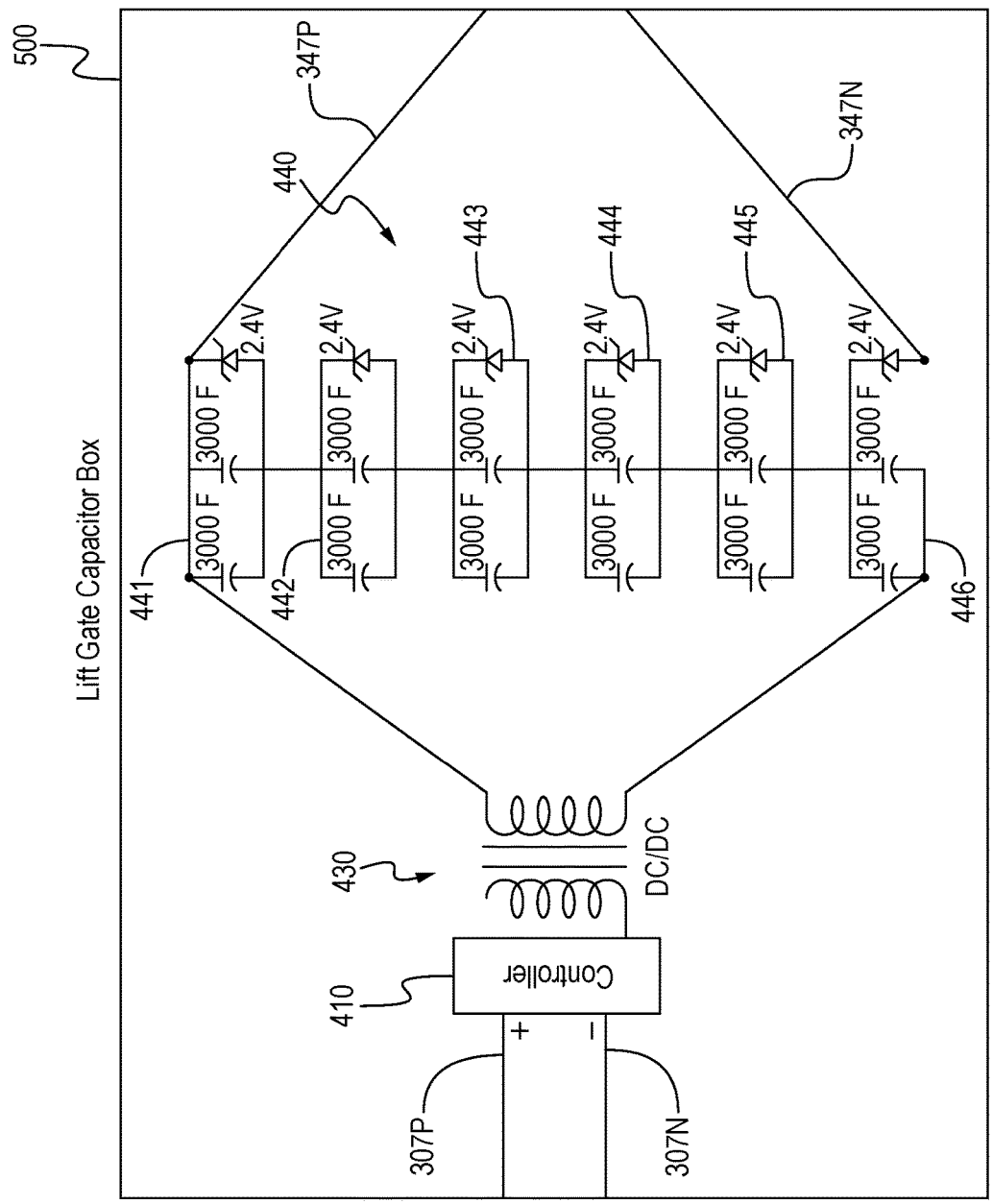
FIG. 5 is an enlarged diagram of a lift gate capacitor box as may be used as part of the hybrid power module of FIG. 4.

In a preferred arrangement, the bank of capacitors 440 resides within a capacitor box, referred to herein as a lift gate capacitor box 500. FIG. 5 is a diagram of a lift gate capacitor box, representing a housing for the hybrid power module 300 of FIG. 3. Truck cables 107P, 107N are seen extending into the capacitor box 500.

The capacitor box 500 holds a current controller 410. The current control 410 limits or controls DC current coming in from the alternator 315. The current control 410, or current limiter, may comprise at least one of a positive-temperature-coefficient resistor and a resistive bridge.

The lift gate capacitor box 500 also holds a DC/DC converter 430. (Note that the DC/DC converter 320 is also shown in FIG. 4.) The DC/DC converter 430 is preferably an integrated DC/DC boost converter. The DC/DC converter includes an input side and an output side. The input side is connected to the electrical cables 307 that extend from the alternator 315, via the controller 410, while the output side is connected to the bank of capacitors 440. In one aspect, the DC/DC converter 430 is configured to boost voltage from 8 volts DC to 14.5 volts DC.

The bank of capacitors 440 represents a plurality of individual super capacitors 441, 442, 443, 444, 445 and 446. The super capacitors (or ultra-capacitors) 441, . . . 446 may be configured in a 6×2 array, providing two parallel sets of six capacitors, in series. The super capacitors 4441, . . . 446 may add 72,000 joules of lifting energy that support battery health by assisting with heavy loads.

The super capacitors 441, . . . 446 are in electrical communication with and are charged by the alternator 315 of the truck 400. In one embodiment, the capacitor bank 440 is configured to put out at least 200 Amps of current for at least two minutes for operating the motor 358 for the lift gate 350, even without the batteries 450, 460, which hopefully will never be necessary.

The capacitor bank 440 is configured to boost the charging voltage of the first 450 and second 460 batteries when the electric motor 358 of the lift gate platform 355 is being moved. Cables or wires 347P, 347N connect the bank of super capacitors 440 to the batteries 450, 460.

In one embodiment, a rectifier (not shown) is provided for the hybrid power module 300. The rectifier is configured to provide unidirectional current flow from the alternator 315 to the bank of super capacitors 440. At the same time, the parallel circuitry between the super capacitor 440 and the batteries 450, 460 allows a bi-directional flow between the batteries 450, 460 and the bank of super capacitors 440. This provides a system wherein the bank of capacitors 440 is configured to "re-charge" a battery 450 when the state of charge and voltage in the bank of capacitors 440 is higher than the battery 450. This, in turn, increases the life of the battery 450. In addition, the efficient charge acceptance and discharge rate of the capacitor 440 can allow the capacitors 441, . . . 446 to mitigate some of the spikes and drops in power typical during operation of the lift gate motor 358.

During operation, when the rear battery 450 is connected, the battery voltage will start to charge at any time during a normal charge cycle, with the bank of capacitors 440 remaining always just 100 mV above the battery absorption voltage, forming a back-up. As the battery voltage goes down over use, so does the capacitor voltage. As a result, the bank of super capacitors 440 handles all of the peak current surges for the battery 450, further enabling long battery life and saving costs in the process.

Because each UC 441, . . . 446 in the capacitor banks 440 will have its own equivalent series resistance (ESR), the UC cells will not all absorb charge equally. Placing the batteries 450, 460 in parallel with the UC bank 440 will accomplish UC balancing within the UC's 441, . . . 446.

In one aspect, the current limiter 410 may be connected in series between the rectifier and the bank of capacitors 440.

In one aspect, current supplied to the lift gate motor 358 from the hybrid power module 300 will be generated proportionally from both the super capacitor 440 and the battery 150. Additionally, because current can flow between the capacitor 440 and the battery 450, the available charge and voltage of the super capacitor 440 will also generally move towards a charge and voltage equilibrium relative to that of the first battery 450 when the alternator 315 is in an off state. Such voltage equilibrium may generally be less than the state of charge and voltage of the capacitor 440 if it were to be electrically isolated from the first battery 450.

In an alternate aspect, a separate rectifier is connected between the bank of capacitors 440 and the first battery 450. The rectifier may comprise a reverse recovery diode. Here, the rectifier is configured to recoup a portion of any unused energy from the lift gate motor 358 when the hybrid power module 300 is operated without the first battery 450.

Returning to FIG. 5, it is preferred that the lift gate capacitor box 500 represents one housing while each of the first 450 and second 460 batteries are in their own housings. The housings form independent "modules" that may be mechanically secured together and placed in electrical communication with the switch 354.

Additional features may be included with the power system 405. For example, the power system 405 may comprise a sensor. The sensor senses the internal resistance of the battery 450. This enables a user to determine the condition of the battery 450. Those of ordinary skill in the art will understand that when a battery sits idle, a chemical reaction can take place in the cells that causes copper sulfate to build up on the battery terminals. This, in turn, rapidly increases the internal resistance of the battery, reducing its ability to generate the charge needed to crank an engine.

The power system 405 may further include a micro-controller. The micro-controller receives signals from the sensor that are indicative of internal resistance. Using a transceiver, the micro-controller then sends the signals to a computer (which may be a network server or may be an application running on a portable communications device, or both). Signals are sent using a wireless communications system.

The signals are processed by the computer such that a remote operator is able to review the signals and determine the status of the battery in real time. In addition, the micro-controller may have a GPS module. In this instance, the micro-controller sends signals indicative of GPS coordinates. In this way, the operator may determine a location of the power system 405 at any given moment.

There are multiple advantages to the hybrid power module 300 described herein. These include elimination of the voltage drop inherent with long truck cabling from the main system battery to the lift gate. These also include preventing the lift gate from getting stuck with a poorly charged or dead battery.

Beneficially, the power system 405 uses a non-isolated DC/DC converter with input current limits that are compatible with existing alternator charging characteristics. The bank of super capacitors is connected to the output of the DC/DC converter and will charge up to approximately 4.5 volts DC in approximately 5 minutes from a typical halfway charge level. This enables the recharge time to be reduced to 5 to 10 minutes, providing an ideal scenario for the truck engaged in numerous delivery stops.

In view of the power module 300 described above, a method of operating a delivery vehicle is also provided herein. Operating the vehicle will include providing electrical energy to drive a liftgate associated with the vehicle.

Figure 6A:
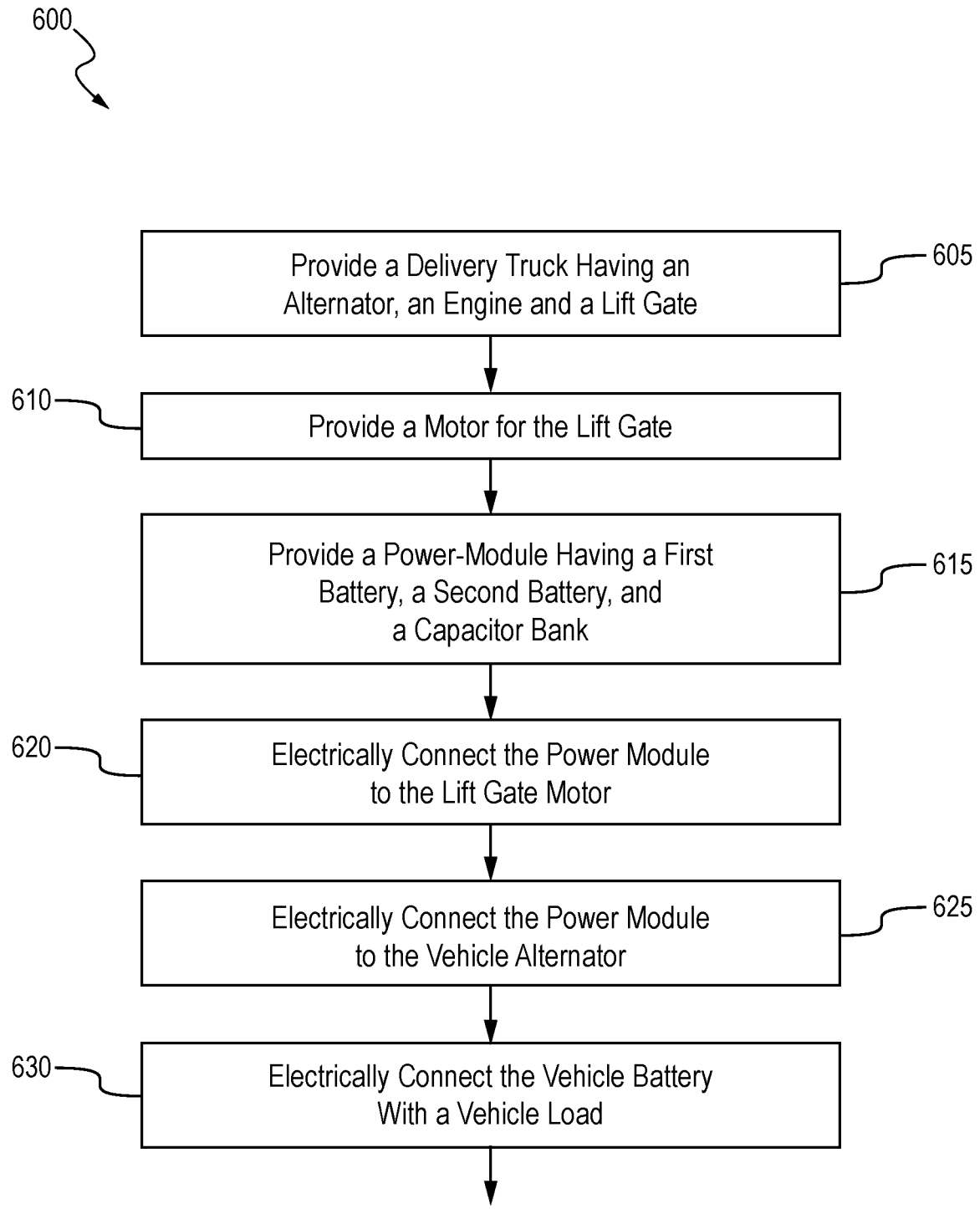
FIGS. 6A and 6B present a single flow chart showing steps for operating a lift gate for a delivery vehicle, in one embodiment. This is done by using the hybrid power module of FIG. 4.
Figure 6B:
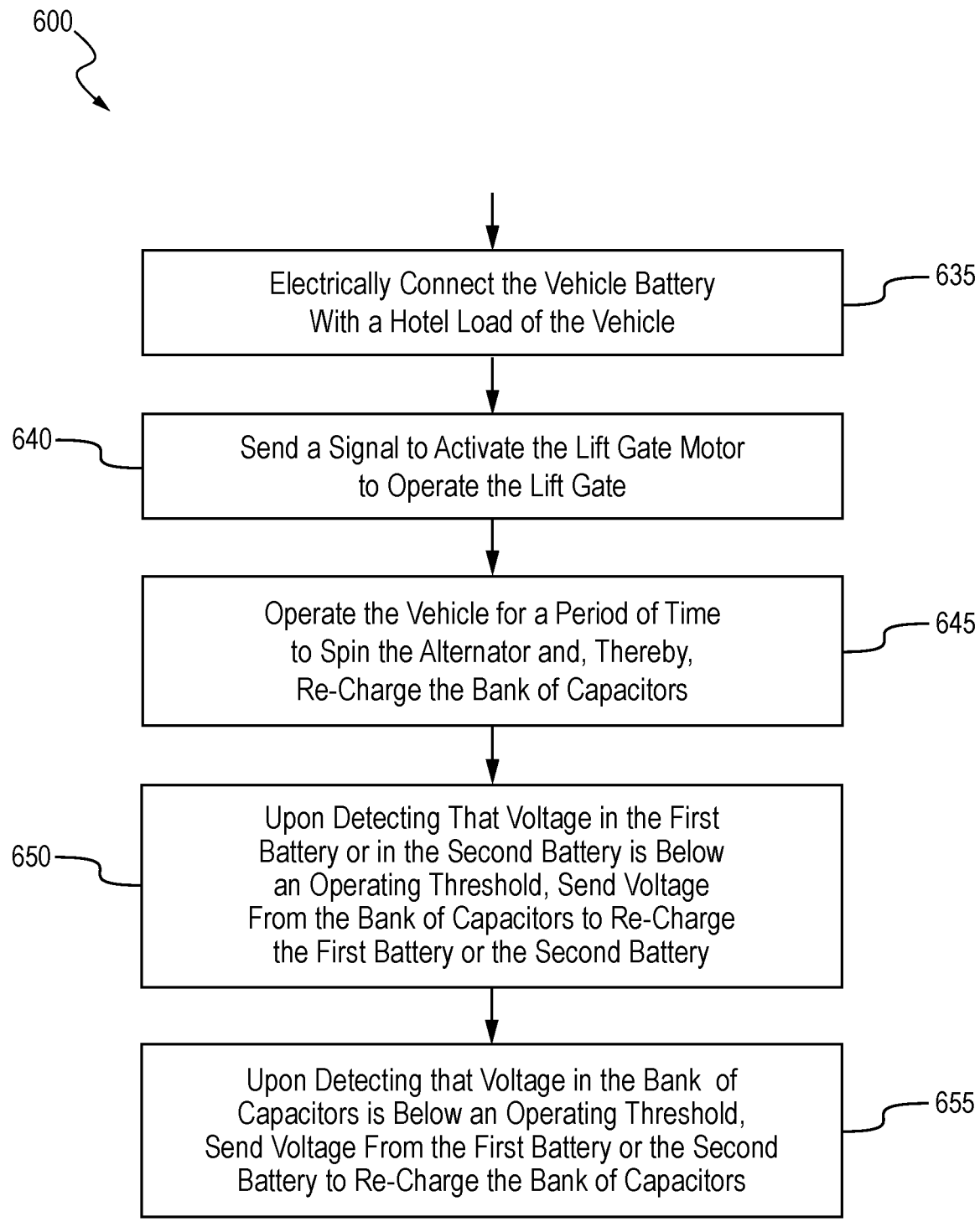

FIGS. 6A and 6B present a single flow chart showing steps for a method 600 for operating a delivery vehicle, in one embodiment. The method 600 first includes providing a delivery vehicle. This is shown at Box 605. The delivery vehicle may be any of the trucks illustrated in FIGS. 100A, 100B, 100C or 100D, so long as they include a lift gate. The vehicle will also have an alternator, a vehicle battery, and an internal combustion engine "under the hood."

The method 600 next includes providing a motor for the lift gate. This is seen in Box 610. The motor is an electric motor in accordance with motor 358 as provided in FIGS. 3 and 4. The motor is configured to supply power to the lift gate in response to instructions from an operator. Preferably, the liftgate motor resides at the back of the delivery vehicle.

The method 600 also comprises providing a power module. This is provided at Box 615. The power module includes a first battery and a capacitor bank. Optionally, a second battery is also provided. The power module may be in accordance with the power module 300 presented in FIG. 5. In this respect, the power module will house a 6×2 array of UC's. A first bank of UC's is connected to cables that are in electrical communication with the vehicle battery, through a DC/DC converter, while the second bank of UC's is in electrical communication with the first and second batteries. The first and second banks of capacitors are positioned within the housing of the capacitor module, in parallel, and are optionally separated by a diode.

The UC's reside within a housing along with a controller and a DC/DC converter, forming a lift gate capacitor box. The lift gate capacitor box may also house the first and second batteries, or may be connected to the first and second batteries, forming the hybrid power module 300.

Preferably, each of the first battery and the second battery is a lithium ion battery, although it may also be, for example, a traditional lead acid battery. Each battery will have a positive terminal and a negative terminal, with the batteries being placed in parallel.

The method 600 further includes electrically connecting the hybrid power module to a liftgate motor. This is shown in Box 620. The power module will comprise a positive and a negative terminal. The power module is placed in series with the vehicle alternator.

The method 600 further includes electrically connecting the hybrid power module to the vehicle alternator. This step is seen in Box 625.

In addition, the method comprises placing the vehicle battery in electrical connection with the vehicle load. This is indicated at Box 630 of FIG. 6A.

The method 600 additionally comprises electrically connecting the vehicle battery with the hotel load of the vehicle. This is shown in box 635 of FIG. 6B.

The method 600 further provides sending a signal to activate an electric motor. This step is provided in Box 640. The motor is associated with the liftgate. Sending the signal to the motor may cause the liftgate to be lowered, to be raised, or to stop at any point along its path of movement. Operation of the liftgate involves a switch as part of a user interface.

The method 600 may also include operating the vehicle for a period of time. This is seen at Box 645. Operating the vehicle may mean driving the vehicle, idling the vehicle, or some combination thereof. Operating the vehicle need not be continuous operation, but may be intermittent meaning that multiple vehicle stops occur, or even that the vehicle sits idle for a period of time between starts (or attempts at starting). In any instance, the result is that the alternator spins, generating energy. This, in turn, charges, or re-charges, the batteries 450, 460 and the bank of capacitors 440.

The capacitor bank may be in accordance with the capacitor bank 440 shown in in FIG. 5. The capacitor bank 440 comprises a series of individual ultra-capacitors, with each ultra-capacitor being in parallel with a corresponding resistor.

Upon detecting that voltage in the first battery or in the second battery is below an operating threshold, voltage is sent from the bank of capacitors to re-charge the corresponding battery. This is provided in Box 650. This may be done automatically through voltage balancing. Alternatively, it may be done automatically through operation of an isolation switch using a controller. In this instance, the controller sends a signal to close the isolation switch until the batteries are re-charged.

Reciprocally, upon detecting that voltage in the bank of capacitors is below an operating threshold, voltage is sent from the first and/or second battery to the bank of capacitors to re-charge the capacitors. This is provided in Box 655. This again may be done automatically through voltage balancing. Alternatively, it may be done automatically through operation of an isolation switch using a controller. In this instance, the controller sends a signal to close the isolation switch until the capacitors in the bank of capacitors are re-charged.

In one aspect, an operator of the vehicle may press a start button associated with a user interface. This sends a signal that causes the isolation switch to close. When the isolation switch closes, energy is released from the bank of super capacitors to the vehicle batteries, or vice versa, allowing for voltage balancing.

As can be seen, a novel power system for operating a lift gate is provided. The hybrid power module, or lift gate capacitor box, compensates for the typically low voltage at the end of the long cables in a trailer. Specifically, a DC/DC boost converter raises that voltage and then charges a bank of internal ultra-capacitors. The voltage input to the DC/DC boost converter can be down to as low as 9V, and the lift gate capacitor box will still charge both the lift gate battery (or rear battery) and the bank of ultra-capacitors. In one aspect, the rear battery (or lift gate battery) will be charged at a rate of 40 Amps.

The lift gate battery will remain in parallel to the bank of ultra-capacitors. The ultra-capacitors will top off the lift gate battery even when the truck is not running. This provides for improved battery peak current. Beneficially, the lift gate capacitor box absorbs the alternator charge more quickly than a traditional wet lead acid battery. Charge can be absorbed from the truck even during short intervals of alternator spinning.

As noted, the lift gate capacitor box has the capacity to put out over 200 Amps for approximately two to three minutes, depending on the actual load being raised or lowered. This enables the lift gate capacitor box to operate a lift gate which is used intermittently. When used without the lift gate battery, a reverse recovery diode can be added to recoup some of the unused energy from the liftgate motor. A common ground is still shared with the truck when used in this mode.

It will be appreciated that the inventions are susceptible to modification, variation and change without departing from the spirit thereof. For example, the power module 300 has been described herein in the context of operating a lift gate for a truck. However, the invention has equal application to supporting dump trailers and heavy load leveling systems. For purposes of this disclosure, the term "lift gate" is intended to include lifting mechanisms used on dump trailers and leveling motors. Further, uses and variations of the hybrid power module may fall within the spirit of the claims, below.

We claim:

1. An electrical power system for a delivery vehicle, with the delivery vehicle having a cab, a cargo compartment residing behind the cab, a combustion engine, and a lift gate secured to the cargo compartment powered by a lift gate motor, and the electrical power system comprising:
   a vehicle battery;
   a vehicle alternator;
   a vehicle starter in electrical communication with the vehicle battery, and configured to start the combustion engine;
   a hybrid power module in electrical communication with the lift gate motor and configured to provide power to the lift gate motor, wherein the hybrid power module comprises:
      a super capacitor comprising a bank of capacitors, with the super capacitor being in electrical communication with the vehicle alternator;
      a first rear battery;
      a switch;
      an integrated DC/DC boost converter residing between the vehicle alternator and the super capacitor;
      a lift gate capacitor box serving as a housing to hold the super capacitor and the DC/DC boost converter;
      a current control residing between the vehicle alternator and the DC/DC boost converter; and
      electrical wiring connecting the super capacitor and the first rear battery to the switch, and also connecting the switch to the lift gate motor;
   and wherein:
      the hybrid power module resides in or on the cargo compartment,
      the super capacitor and the first rear battery are positioned in parallel within the electrical circuit;
      the vehicle further comprises an engine compartment, wherein the vehicle battery, the vehicle alternator, and the vehicle starter all reside within the engine compartment;
      the super capacitor is in electrical communication with the vehicle alternator by means of cables that electrically connect the vehicle alternator with the current control and the DC/DC boost converter; and
      the super capacitor contains enough energy to power the lift gate motor to move the lift gate through at least two operating cycles without using power from the first rear battery.

2. The electrical power system of claim 1, wherein the lift gate capacitor box also houses the rear battery.

3. A hybrid power module for a lift gate associated with a truck, comprising:
   a super capacitor comprising a capacitor bank, with the super capacitor being in electrical communication with an alternator of the truck;
   a first battery;
   a switch;
   an integrated DC/DC boost converter residing between the vehicle alternator and the super capacitor;
   electrical wiring connecting the capacitor bank and the first battery to the switch, and also connecting the switch to a motor for the lift gate;
   a lift gate capacitor box holding the capacitor bank, the DC/DC converter and the first battery; and
   a current control positioned to limit current entering the DC/DC converter from the vehicle alternator;
   electrical wiring connecting the capacitor bank and the first battery to the switch, and also connecting the switch to a motor for the lift gate;
   wherein:
      the truck comprises a cargo compartment;
      the lift gate motor is secured onto or behind the cargo compartment;
      the super capacitor and the first battery reside proximate the lift gate;
      the super capacitor and the first battery are positioned in parallel;
      the super capacitor is in electrical communication with the alternator by means of cable that connect the alternator with the current control; and
      the super capacitor contains enough energy to power the electric motor for the lift gate through at least two operating cycles without the first battery.

4. The hybrid power module of claim 3, wherein the capacitor bank is configured to put out at least 200 Amps of current for at least two minutes for operating the motor for the lift gate.

5. The hybrid power module of claim 3, further comprising:

a second battery also in parallel to the first battery and the super capacitor;

and wherein the second battery also resides within the lift gate capacitor box.

6. The hybrid power module of claim 3, further comprising:
a rectifier connected between the first battery and the capacitor bank, with the rectifier being configured to recoup a portion of any unused energy from the lift gate motor when the hybrid power module is operated without the first battery.

7. The hybrid power module of claim 6, wherein the rectifier comprises a reverse recovery diode, a synchronous rectifier, or a transistor.

8. The hybrid power module of claim 3, wherein the current control is configured to limit current flow from the alternator to the capacitor bank.

9. The hybrid power module of claim 8, wherein the current control comprises at least one of a positive-temperature-coefficient resistor and a resistive bridge.

10. The hybrid power module of claim 5, wherein:
the DC/DC boost converter is configured to boost voltage from 8 volts DC to 14.5 volts DC;
the bank of capacitors comprises 9 super capacitors yielding a total capacitance of at least 1,000 Farads;
the DC/DC boost converter comprises an input side and an output side, with the input side being connected to the cables from the alternator, by means of the current control; and
the output side of the DC/DC boost converter is connected to the bank of capacitors.

11. The hybrid power module of claim 10, wherein:
the bank of capacitors is configured in a 6×2 array, providing two parallel sets of six capacitors, in series.

12. The hybrid power module of claim 3, wherein:
the lift gate capacitor box further holds the first battery.

13. The hybrid power module of claim 12, wherein the capacitor bank is configured to put out at least 200 Amps of current for at least two minutes for operating the motor for the lift gate.

14. The electrical power system of claim 12, wherein the capacitor bank comprises a 6×2 array of ultra-capacitors providing two parallel sets of six capacitors, in series.

15. The electrical power system of claim 12, wherein the first battery and the second battery are each lithium-ion batteries.

16. A delivery vehicle, comprising:
an engine compartment, a combustion engine residing within the engine compartment, a cab, and a cargo compartment residing behind the cab;
a lift gate system residing on the cargo compartment, the lift gate system comprising:
an electrical lift gate motor;
a lift gate; and
a user interface for controlling the lift gate motor; and
an electrical system, wherein the electrical system comprises:
a vehicle battery;
a vehicle alternator;
a relay start in electrical communication with the engine; and
a power module configured to provide power to the lift gate motor, comprising:
a super capacitor comprising a capacitor bank, with the super capacitor being in electrical communication with the alternator of the delivery vehicle by means of cables;
a switch;
a first rear battery;
an integrated DC/DC boost converter residing between the vehicle alternator and the super capacitor; and
electrical wiring connecting the super capacitor and the first rear battery to the switch, and also connecting the switch to the lift gate motor;
wherein:
the super capacitor and the first rear battery reside proximate the lift gate;
the super capacitor and the first rear battery are positioned in parallel;
the first rear battery, the super capacitor, and the DC/DC boost converter reside together within a housing;
the super capacitor comprises a plurality of ultra-capacitor (UC) cells placed in series;
the electrical system further comprises a current control placed between the vehicle alternator and the power module and
the super capacitor contains enough energy to power the electrical lift gate motor through at least two operating cycles without the first battery.

17. The delivery vehicle of claim 16, wherein the super capacitor is in electrical communication with the vehicle alternator by means of cables that connect the alternator with the current control, through the DC/DC boost converter.

18. The delivery vehicle of claim 17, wherein the power module further comprises:
a second rear battery also in parallel to the first rear battery and the super capacitor, wherein the capacitor bank is configured to boost the charging voltage of the second rear battery when the electric motor of the lift gate is in operation; and
a rectifier connected between the first rear battery and the capacitor bank, with the rectifier being configured to recoup a portion of any unused energy from the lift gate motor when the hybrid power module is operated without the first battery.

19. The delivery vehicle of claim 16, wherein
the capacitor banks yield a total capacitance of at least 1,000 Farads; and
when the capacitor bank is fully charged, the DC/DC boost converter transmits current from the capacitor bank to the first rear battery to charge the first rear battery.

20. A method for operating a lift gate, comprising:
providing a delivery vehicle, the delivery vehicle having an engine compartment, a cab, a cargo compartment residing behind the cab, an alternator, a combustion engine, and a vehicle battery;
providing a lift gate for the cargo compartment, and a lift gate motor;
providing a power module residing in or on the cargo compartment; and
sending an electrical signal to the lift motor to operate the lift gate;
wherein the power module comprises:
a super capacitor comprising a plurality of ultra-capacitors, with the super capacitor being in electrical communication with the alternator of the delivery vehicle by means of cables,
a switch;
a rear battery;
an integrated DC/DC boost converter residing between the alternator and the super capacitor; and electrical wiring connecting the super capacitor and the rear battery to the switch, and also connecting the switch to the liftgate motor;

and wherein:

the alternator, the combustion engine, and the vehicle battery reside within the engine compartment of the delivery vehicle;

the lift gate motor is secured onto the cargo compartment at a rear of the delivery vehicle;

the super capacitor and the rear battery are positioned in parallel and reside along with the DC/DC boost converter within a housing; and the super capacitor contains enough energy to power the liftgate motor through at least two operating cycles without the rear battery.

21. The method of claim 20, wherein:

sending a signal to operate the liftgate comprises sending an electrical signal from the power module to the electric motor to cause the lift gate to be raised or to be lowered.

22. The method of claim 20, further comprising:

operating the delivery vehicle for a period of time to spin the alternator, thereby charging the super capacitor within the power module.

23. The method of claim 20, wherein:

the capacitor system further comprises an isolation switch residing within the housing, and a control button; and the method further comprises pressing the control button, thereby closing the isolation switch to send charge from the rear battery to the capacitor bank.

24. The method of claim 20, wherein the power module further comprises:

a current control residing between the vehicle alternator and the DC/DC boost converter;

and wherein the super capacitor is in electrical communication with the vehicle alternator by means of cables that electrically connect the vehicle alternator with the current control and the DC/DC boost converter.

25. The method of claim 21, wherein the super capacitor comprises a bank of ultra-capacitors configured in a 6×2 array, providing two parallel sets of six capacitors, in series.

26. The method of claim 21, further comprising:

electrically connecting the power module to the lift gate motor; and electrically connecting the alternator to the power module.

27. The method of claim 21, further comprising:

upon detecting that voltage in the rear battery is below an operating threshold, sending voltage from the super capacitor to re-charge the rear battery.

28. The method of claim 21, further comprising:

upon detecting that voltage in the super capacitor is below an operating threshold, sending voltage from the rear battery to re-charge the super capacitor.

* * * * *